UNITED STATES PATENT OFFICE.

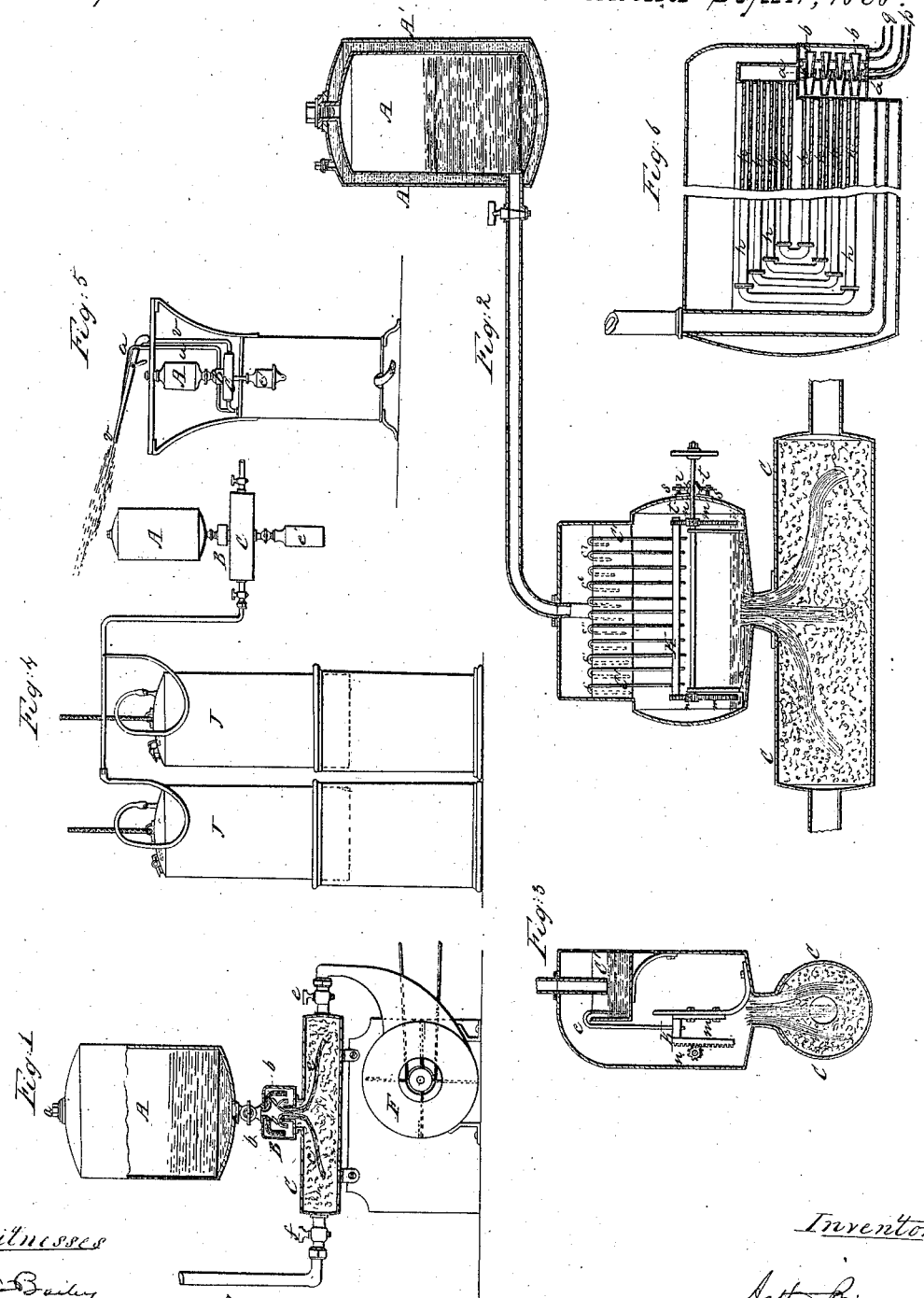

ARTHUR BRIN, OF PARIS, FRANCE.

IMPROVED APPARATUS FOR CARBURETING AIR AND APPLYING THE SAME.

Specification forming part of Letters Patent No. 81,590, dated September 1, 1868.

*To all whom it may concern:*

Be it known that I, ARTHUR BRIN, of Paris, in the Empire of France, have invented certain new and useful Improvements in Generating and Applying Gas for Heating and other Purposes; and I hereby declare the following to be a full, clear, and exact description of the same, reference being had to the accompanying drawings.

My invention relates to the manufacture of gas by charging air with the vapor of hydrocarbon fluids, particularly those arising from the distillation of petroleum, schist, and like hydrocarbons; and its object is mainly to produce a carbureting apparatus in which the gas can be generated easily, with regularity, and without danger of explosion, thus obviating objections which have heretofore prevented to any great extent the introduction of this method of generating gas. To this end I so construct the apparatus that the feed of the volatile liquid takes place slowly but continuously, while it is distributed automatically and with great regularity. The generator may be arranged in two ways, one of which admits of the feed being regulated with great precision and exactness. The air to be carbureted is carried into the generator by any suitable means, preferably by a blowing apparatus actuated by spring-power or its equivalent.

The nature of my invention will, however, be better understood by reference to the accompanying drawings, which will now be described.

A simple arrangement of the carbureting apparatus is shown in sectional elevation in Figure 1, the carburetor being intended to feed but one gas-burner, forming, as it were, a portable lamp.

The essential portions of the apparatus are—

First. The reservoir A for containing the volatile liquor, hermetically closed by a screw-cap, *a*.

Second. The feeder B, which receives drop by drop the liquid from the reservoir through the conduits *b b*.

Third. The carburetor C, in which two metallic cords or wicks, *c c*, draw off the liquid which falls into the feeder. The carburetor is filled with a porous or spongy material, *d*, preferably cotton or other substance capable of absorbing and taking up the liquid. Two stop-cocks, *e* and *f*, placed at the two ends of the carburetor, serve, the one, *e*, to admit the air, the other, *f*, to discharge the made gas through the conduit *g*, which conducts it to the burner, where it is to be consumed.

The base upon which the three above-mentioned parts rest incloses the blower F, which forces air into the carburetor. The air, in passing through the carburetor, produces the necessary pressure upon the liquid in the reservoir, and, causing the drops to fall into the feeder, draws them, with the assistance of the capillary action of the wicking *c*, into the carburetor, where the liquid is vaporized. As the vessels are all hermetically closed, the liquid is completely isolated from contact with the atmosphere, and is thus removed from danger of exploding. Besides, the feed and vaporization of the liquid being dependent upon the current of air forced in, the production of the gas is effected automatically, continuously, and proportionately to the quantity of air supplied by the blower, which can be regulated at will.

The modification of my invention shown in longitudinal section, Fig. 2, and transverse section, Fig. 3, differs from the apparatus just described in having a double casing, A', for the reservoir, which may thus, as represented in the drawings, be surrounded by a water-jacket, rendering it doubly secure against danger of leakage, &c. It is also further provided with a series of siphon-tubes of graduated lengths for the purpose of varying the feed to any degree desired. The tubes *c c' c''*, of any number—eleven, for example, as shown in the drawings—have their branches which extend into the intermediate hydrocarbon-liquid receptacle, C, of varying lengths. Their lower ends are set in a bar, K, which can be raised or lowered, so as to cause a greater or less number, as may be desired, of the siphons to communicate with the liquid in the receptacle C'.

The movement of the bar K is effected by means of a suitable mechanism, such as represented in the drawings, which consists of two racks, *m m*, attached to the bar K, and a small arbor or shaft carrying two pinions, *n*, which gear with the racks. One end of the shaft is supported by a standard placed in the feeder, and the other passes out of the feeder through a stuffing-box, constructed as shown in the drawings, so as to prevent all escape of vapor or liquid. The shaft is turned by means of a hand-wheel, so as to cause the revolution of the pinions $n$ and the consequent elevation or lowering of the racks and bar K to which they are attached. In this apparatus three or more wicks, $c$, are employed, as may be desired.

Fig. 4 represents a side view of my improved carburetor connected with and receiving air forced from two gasometers, J J, in which the pressure of the air can readily be regulated to the degree desired. In order to catch any surplus or excess of liquid in the carburetor, a small vessel, $e'$, may be placed underneath and connected with it, as shown in the figures referred to.

Apparatus made as described above may be readily applied for heating purposes.

Fig. 5 represents the method of using the apparatus in connection with a blow-pipe. In this case the air from the blower serves at once to generate the gas which issues through the tube $v$ and to furnish the air which passes through the tube $u$. A blow-pipe of this kind develops a much more intense heat than other apparatus of the same kind in which hydrogen is employed.

Fig. 6 represents a tubular boiler connected with my improved generator or carburetor and heated by the gas generated in said apparatus. The means I have devised in order to adapt the boiler to be heated in this manner consists of a box divided into two compartments, $a\ b$, in which are arranged two series of nozzles or tubes, $c\ d$. The vapor-gas is conducted from the carburetor through the pipe $p$ into the compartment $a$, and is discharged through the nozzles $c$. The air passes from the blower through the pipe $q$ into the nozzles $d$, each of which is inserted from the rear in one of the nozzles $e$, thus forming, as it were, a series of blow-pipes. These burners or blow-pipes open into the tubes $h$ of the boiler, which extend to the other end of the boiler, and are then bent or curved so as to return and open into a chamber or space over the burners, which communicate with the chimney through lateral flues surrounding the whole of the tubes $h$. The burning gases heat first the lower part of the tubes, and then, passing through the upper portion of the same, are discharged into the chamber or space above the burners and impart their heat to the surrounding flues before passing out from the chimney. The water in the boiler can be thus heated with extreme rapidity and uniformity.

A carbureting or gas-generating apparatus such as above described can also be used advantageously for heating culinary apparatus or for warming railroad-cars. In the latter case one or more blow-pipes or burners such as described in Fig. 6 may be employed to discharge the gas-flame into conduits or pipes passing under the seats and provided with register-valves.

From the foregoing it will be seen that the principal feature of my invention consists in the means herein described for effecting the continuous and graduated feed or supply of the carbureting-fluid.

Owing to the construction of the apparatus and to the employment of the feeder intermediate between the fluid-reservoir and the carbureting-chamber, I am enabled to generate the vapor-gas not only from volatile hydrocarbon alone, but also from such fluids mixed in suitable proportions with alcohol or other inflammable liquid.

It will of course be understood that instead of the metallic wicking or strands herein named any other suitable absorbent material, either vegetable or animal, may be employed.

Having now described my invention and the manner in which the same is or may be carried into effect, what I claim, and desire to secure by Letters Patent, is as follows:

1. In apparatus such as described, the combination, with the fluid-reservoir and carbureting-chamber, of an interposed feeding-vessel connected with both the reservoir and the carbureting-chamber in the manner described, and communicating with the latter by means of wicking, which supplies the quantity of fluid required to charge the air in said chamber, as set forth.

2. The combination, with the feeding-vessel and trough formed therein for receiving the liquid from the reservoir, of a series of siphons of graduated length, and racks and pinions and shaft for elevating or lowering said siphons, and thus regulating the flow of the liquid to the carbureter, in the manner shown and specified.

3. The employment, in connection with an apparatus such as described, of a blow-pipe to which air from the blower and carbureted air from the gas-generating chamber are supplied, substantially in the manner described, and illustrated in Fig. 5.

4. The combination, with a tubular boiler, of two series of nozzles, arranged with relation to each other and the boiler-flues as represented in Fig. 6, the one series communicating with a blower or air-supply apparatus and the other with the gas-generating chamber of the carbureting apparatus, substantially as and for the purposes herein set forth.

In testimony whereof I have signed my name to this specification before two subscribing witnesses.

A. BRIN.

Witnesses:
C. LAFOND,
JAMES HAND.